US008833999B2

(12) United States Patent
Wang et al.

(10) Patent No.: US 8,833,999 B2
(45) Date of Patent: Sep. 16, 2014

(54) ELECTRONIC DEVICE HAVING A FLEXIBLE SCREEN, A BACKLIGHT MODULE AND A LIGHT GUIDE PLATE

(75) Inventors: Yi-Kai Wang, New Taipei (TW); Tarng-Shiang Hu, New Taipei (TW); Yu-Jung Peng, New Taipei (TW); Chih-Hao Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 48 days.

(21) Appl. No.: 13/616,807

(22) Filed: Sep. 14, 2012

(65) Prior Publication Data

US 2013/0163278 A1 Jun. 27, 2013

(30) Foreign Application Priority Data

Dec. 23, 2011 (TW) ............... 100148374 A

(51) Int. Cl.
*F21V 7/04* (2006.01)
(52) U.S. Cl.
USPC ............ 362/606; 362/608; 362/610; 362/628
(58) Field of Classification Search
USPC ......... 362/606, 612, 625, 628, 632, 608, 610; 359/431, 599, 707
See application file for complete search history.

(56) References Cited

U.S. PATENT DOCUMENTS

| 7,188,989 | B2 | 3/2007 | Miyashita |
| 7,334,932 | B2* | 2/2008 | Klettke ........................ 362/612 |
| 8,220,979 | B2* | 7/2012 | Chang et al. ................. 362/610 |
| 8,253,875 | B2* | 8/2012 | Kim ............................... 349/58 |
| 8,593,720 | B2 | 11/2013 | Hirano et al. |
| 2010/0165236 | A1 | 7/2010 | Bae et al. |
| 2010/0277665 | A1 | 11/2010 | Kuo et al. |
| 2013/0051076 | A1* | 2/2013 | Mizuno et al. ............... 362/613 |

FOREIGN PATENT DOCUMENTS

| CN | 1510487 A | 7/2004 |
| JP | 2011-96417 A | 5/2011 |
| TW | 201039014 A1 | 11/2010 |
| WO | WO 2011/142080 A1 | 11/2011 |

OTHER PUBLICATIONS

Taiwanese Office Action mailed Jun. 12, 2014 in Taiwanese Application No. 100148374 with partial English translation (11 pages).

* cited by examiner

*Primary Examiner* — John A Ward
(74) *Attorney, Agent, or Firm* — Nixon & Vanderhye P.C.

(57) ABSTRACT

An electronic device includes a base having two opposite sidewalls, two carriers connected pivotally and respectively to the sidewalls, and two light guide plates respectively disposed on the carriers. The carriers are rotatable relative to the base between a first position, where the carriers cooperatively define a carrier surface, and a second position, where the carriers are parallel to each other. A flexible screen is superposed on the light guide plates, is expanded to a planar state when move along with the carriers to the first position, and is folded when move along with the carriers to the second position.

10 Claims, 7 Drawing Sheets

ELECTRONIC DEVICE HAVING A FLEXIBLE SCREEN, A BACKLIGHT MODULE AND A LIGHT GUIDE PLATE

CROSS-REFERENCE TO RELATED APPLICATION

This application claims priority of Taiwanese Patent Application No. 100148374, filed on Dec. 23, 2011, the disclosure of which is incorporated herein by reference.

BACKGROUND OF THE INVENTION

1. Field of the Invention

The invention relates to an electronic device having a flexible screen and a light guide plate, more particularly to an electronic device that has a flexible screen and a light guide plate and that can reduce bright lines.

2. Description of the Related Art

Currently, an electronic device having a flexible screen usually includes two backlight modules that are connected when the flexible screen is expanded to provide backlight thereto and that are spaced one above the other when the flexible screen is folded.

However, since light guide plates of the backlight modules are flat and emit more light at the edges thereof, when the light guide plates of the backlight modules are connected, bright lines may be easily produced at a junction thereof. As a result, an overall backlight brightness provided by the backlight modules to the flexible screen is not uniform. This adversely affects the quality of the flexible screen.

SUMMARY OF THE INVENTION

Therefore, an object of the present invention is to provide an electronic device that has a flexible screen and that can enhance uniform backlight brightness.

Another object of the present invention is to provide a light guide plate and a backlight module that can enhance uniformity of light.

According to one aspect of this invention, an electronic device comprises a backlight module and a flexible screen. The backlight module includes a housing unit and two light guide plates. The housing unit includes a base having two opposite sidewalls, and two carriers connected pivotally and respectively to the sidewalls. The carriers are rotatable relative to the base between a first position, where the carriers cooperatively define a carrier surface, and a second position, where the carriers are parallel to each other. The light guide plates are respectively disposed on the carriers. Each of the light guide plates has a plate body supported by a respective one of the carriers, and a bent portion extending curvedly from an inner side of the plate body into the base. When the light guide plates move along with the carriers to the first position, the bent portions of the light guide plates are adjacent to each other and are bent into the base. The flexible screen is disposed on the housing unit and is superposed on the light guide plates. The flexible screen is expanded to a planar state when move along with the carriers to the first position, and is folded when move along with the carriers to the second position.

According to another aspect of this invention, a backlight module comprises a housing unit and two light guide plates. The housing unit includes a base having two opposite sidewalls, and two carriers connected pivotally and respectively to the sidewalls. The carriers are movable relative to the base between a first position, where the carriers cooperatively define a carrier surface, and a second position, where the carriers are parallel to each other. The light guide plates are respectively disposed on the carriers. Each of the light guide plates has a plate body supported by a respective one of the carriers, and a bent portion extending cursedly from an inner side of the plate body into the base. When the light guide plates move along with the carriers to the first position, the bent portions of the light guide plates are adjacent to each other and are bent into the base.

According to still another aspect of this invention, a light guide plate comprises a plate body and a bent portion extending curvedly from an inner side of said plate body. The bent portion and the plate body define therebetween an angle ranging from 0 to 120 degrees.

The efficiency of this invention resides in that because each of the light guide plates has the bent portion, the end faces of the bent portions of the two adjacent sides of the light guide plates face in a direction away from the flexible screen so as to reduce the amount of light emitted from the adjacent sides of the two light guide plates toward the flexible screen. As such, a bright line that may be produced on the junction of the light guide plates can be prevented, thereby enhancing the uniformity of light of the overall backlight source.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
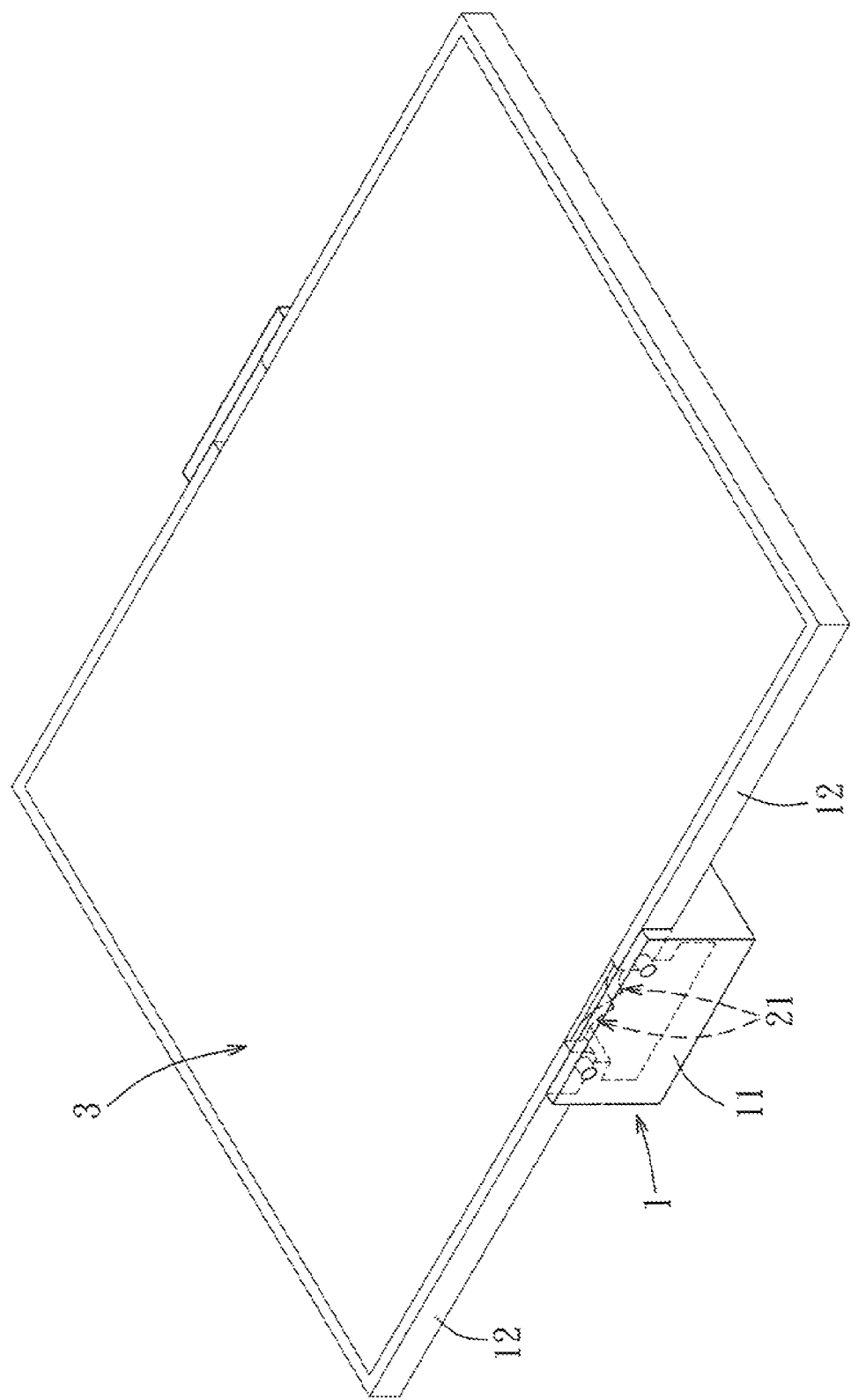
FIG. 1 is an assembled perspective view of an electronic device according to the first embodiment of this invention.

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Figure 2:
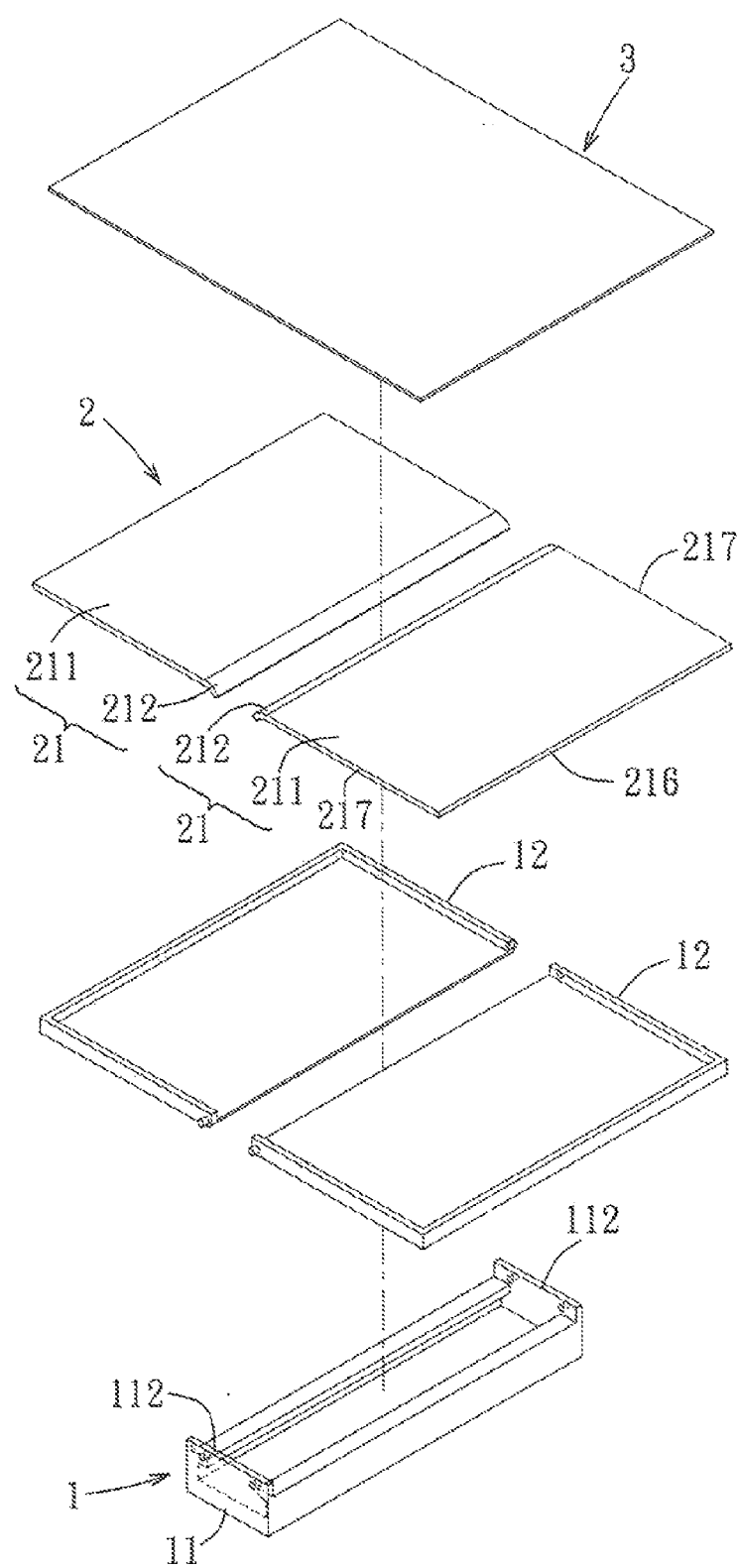
FIG. 2 is an exploded perspective view of the first embodiment.

Referring to FIGS. 1 and 2, an electronic device according to the first embodiment of the present invention is shown to comprise a backlight module 2 and a flexible screen 3.

Figure 3:
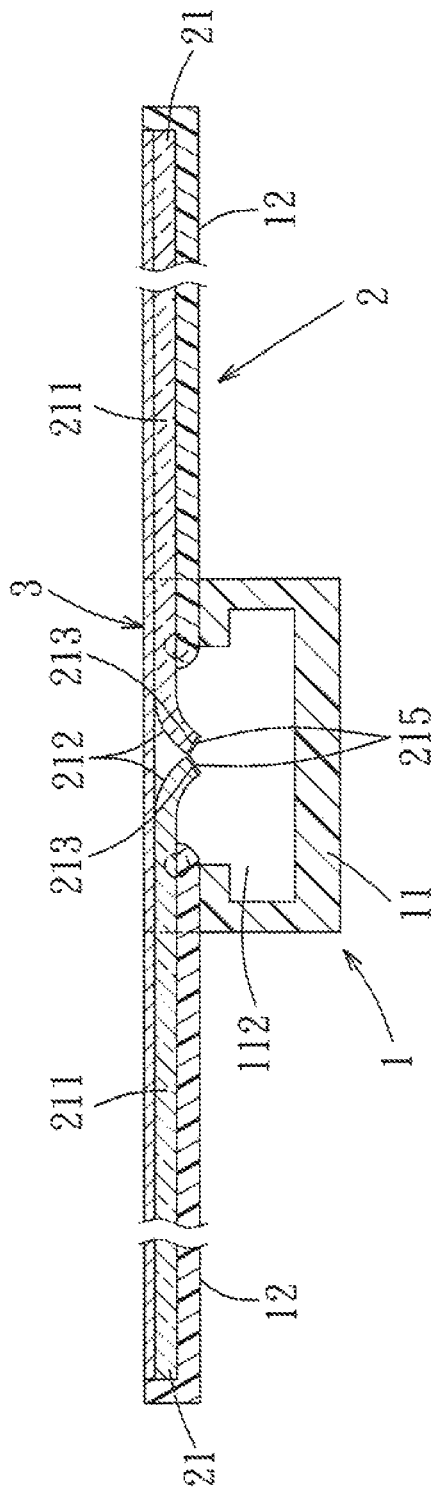
FIG. 3 is a sectional side view of the first embodiment, illustrating two carriers being disposed at a first position.

The backlight module 2 includes a housing unit 1 and two light guide plates 21. The housing unit 1 includes a base 11 having two opposite sidewalls 112, and two carriers 12 respectively pivoted to the sidewalls 112. The carriers 12 are rotatable relative to the base 11 between a first position and a second position. In the first position, as shown in FIG. 3, the carriers 12 lie on a same plane and cooperatively define a carrier surface to support the flexible screen 3 thereon. In the second position, as shown in FIG. 4, the carriers 12 are parallel to each other.

Figure 4:
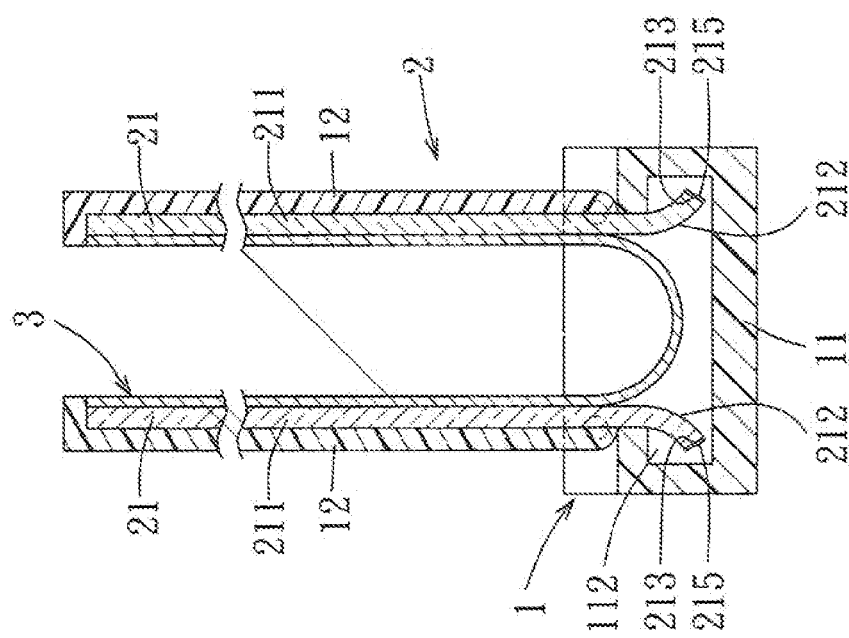
FIG. 4 is a view similar to FIG. 3, but illustrating the carriers being disposed at a second position.

With reference to FIGS. 2 to 4, each of the light guide plates 21 has a plate body 211 supported by a respective one of the carriers 12, and a bent portion 212 extending curvedly from an inner side of the plate body 211 into the base 11. When the light guide plates 21 move along with the carriers 12 to the first position, the bent portions 212 are adjacent to each other and are bent into the base 11.

The flexible screen 3 is disposed on the housing unit 1, and is superposed on the light guide plates 21. The flexible screen 3 is expanded to a planar state (see FIG. 3) when move along with the carriers 12 to the first position, and is folded or curved (see FIG. 4) when move along with the carriers 12 to the second position. The bent portions 212 of the light guide plates 21 are bent away from each other and away from the flexible screen 3 when the carriers 12 are in the second position.

The backlight module 2 further includes a plurality of light-emitting components, such as light-emitting diodes (not shown). The light-emitting components may be disposed on either lateral sides 216 of the plate bodies 211 that are opposite to the bent portions 212 or lateral sides 217 of the plate bodies 211 that are connected to the bent portions 212, or on both lateral sides 216, 217.

Figure 7:
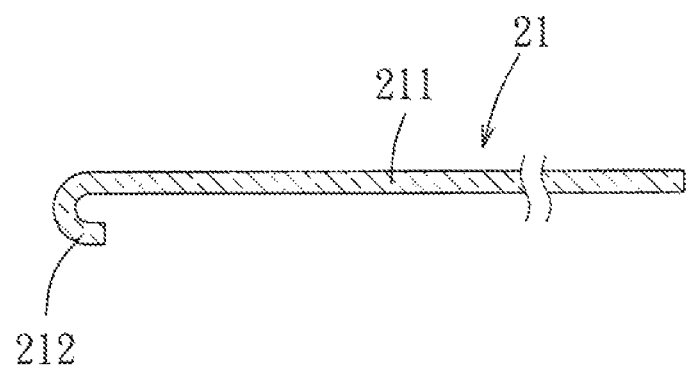
FIG. 7 is a fragmentary sectional view of an alternative form of the light guide plate.

In this embodiment, each light guide plate 21 is made by injection molding polymethyl methacrylate (PMMA). However, other optical grade resins, such as polycarbonate (PC) may be used. The plate body 211 and the respective bent portion 212 define therebetween an angle of 120 degrees. However, the angle that is less than 120 degrees may be acceptable, for example, 90 degrees as will be described in the second embodiment, or 0 degree as shown in FIG. 7. Through this, end faces 213 of the bent portions 212 emit light in directions away from the flexible screen 3 to prevent production of bright lines at adjacent sides of the light guide plates 21. Further, the angles defined between the plate body 211 and the respective bent portions 212 may be different.

Figure 5:
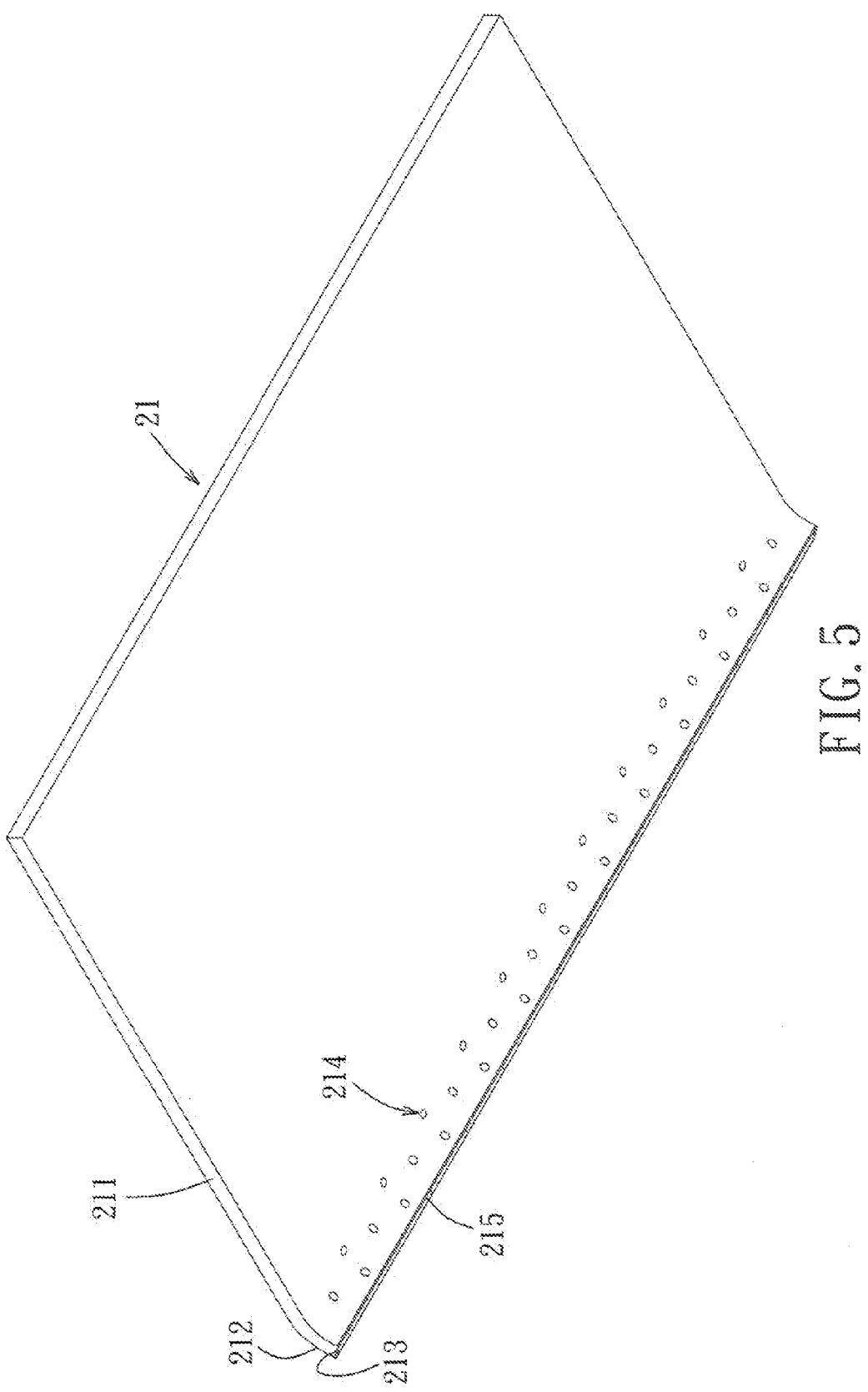
FIG. 5 is a perspective view of a light guide plate of the first embodiment.

Referring to FIG. 5, in combination with FIG. 3, each light guide plate 21 further has a diffusion structure 214 provided on the bent portion 212, and a function layer 215 attached to the end face 213 of the bent portion 212. In this embodiment, the diffusion structure 214 includes a plurality of diffusion points distributed on a surface of the bent portion 212 and a coarse surface (or microstructure) formed on the end face 213, so that the bent portion 212 can emit uniform light. The density of the diffusion points may be adjusted according to the requirement. Further, the diffusion structure 214 may only include the diffusion points or the coarse surface. Moreover, in this embodiment, the function layer 215 is a light-reflection layer for reflecting light back to the light guide plate 21 for re-use. The light-reflection layer may be formed by coating directly on the end face 213, or by adhering a light-refection piece to the end face 213.

In an alternative embodiment, the function layer 215 may be a light-absorbing layer to reduce the amount of light emitting from the end face 213. Similarly, the light-absorbing layer may be formed by coating directly on the end face 213 or by adhering a light-absorbing piece to the end face 213. The disposition of the diffusion structure 214 and the function layer 215 being a light-reflection or light-absorbing layer may be adjusted according to the requirement. Further, the diffusion structure 214 or the function layer 215 may be dispensed with. Moreover, the backlight module 2 may further include other optical films (not shown), such as prism film, diffusion film, reflection piece, etc., and may be implemented using an existing technology. A detailed description thereof is dispensed herewith.

Figure 6:
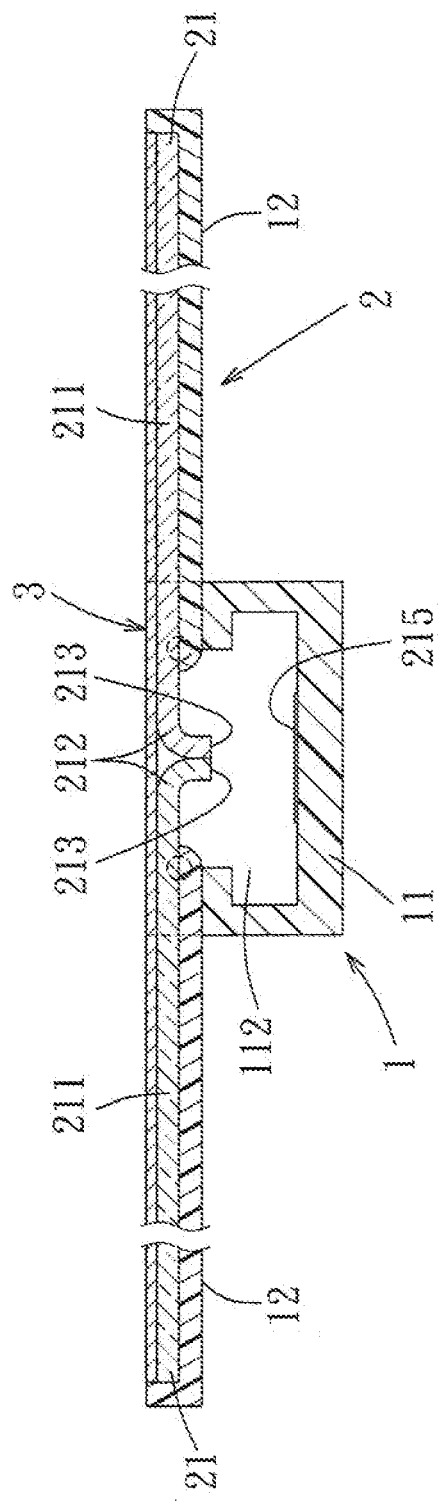
FIG. 6 is a sectional side view of an electronic device according to the second embodiment of this invention.

Referring to FIG. 6, an electronic device according to the second embodiment of this invention is similar to the first embodiment. However, in this embodiment, the angle defined between the plate body 211 and the respective bent portion 212 is 90 degrees, and the function layer 215 is disposed on an inner surface of the base 11 confronting the end faces 213 of the bent portions 212. The efficiency of the first embodiment can be similarly achieved using the second embodiment. And just like the first embodiment, the function layer 215 may be a light-reflection layer or a light-absorbing layer, and may be formed by coating directly on the inner surface of the base 11 or by adhering the light-reflection or light-absorbing piece to the inner surface of the base 11.

In sum, in the aforesaid first and second embodiments, because each of the light guide plates 21 has the bent portion 212, the end faces 213 of the bent portions 212 of the two adjacent sides of the light guide plates 21 face in a direction away from the flexible screen 3 so as to reduce the amount of light emitted from the adjacent sides of the two light guide plates 21 toward the flexible screen 3. As such, a bright line that may be produced on the junction of the light guide plates 21 can be prevented, thereby enhancing the uniformity of light of the overall backlight source.

While the present invention has been described in connection with what is considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
a backlight module including
a housing unit including a base having two opposite sidewalls, and two carriers connected pivotally and respectively to said sidewalls, said carriers being rotatable relative to said base between a first position, where said carriers cooperatively define a carrier surface, and a second position, where said carriers are parallel to each other, and
two light guide plates respectively disposed on said carriers, each of said light guide plates having a plate body supported by a respective one of said carriers, and a bent portion extending curvedly from an inner side of said plate body into said base, when said light guide plates move along with said carriers to said first position, said bent portions of said light guide plates are adjacent to each other and are bent into said base; and
a flexible screen disposed on said housing unit and superposed on said light guide plates, said flexible screen being expanded to a planar state when move along with said carriers to said first position, and being folded when move along with said carriers to said second position.

2. The electronic device as claimed in claim 1, wherein each of said bent portions and said plate body define therebetween an angle ranging from 0 to 120 degrees, and the angles between said bent portions and said plate body can be same or different.

3. The electronic device as claimed in claim 1, wherein each of said light guide plates further has a diffusion structure provided on a respective one of said bent portions.

4. The electronic device as claimed in claim 1, wherein each of said light guide plates further has a function layer provided on an end face of said bent portion, said function layer having a light reflection or light absorbing function.

5. The electronic device as claimed in claim 1, wherein said backlight module further includes a function layer provided within said base and confronting end faces of said bent portions of said light guide plates, said function layer having a light reflection or light absorbing function.

6. A backlight module comprising:
a housing unit including a base having two opposite sidewalls, and two carriers connected pivotally and respectively to said sidewalls, said carriers being movable relative to said base between a first position, where said carriers cooperatively define a carrier surface, and a second position, where said carriers are parallel to each other; and
two light guide plates respectively disposed on said carriers, each of said light guide plates having a plate body supported by a respective one of said carriers, and a bent portion extending curvedly from an inner side of said plate body into said base, when said light guide plates move along with said carriers to said first position, said bent portions of said light guide plates are adjacent to each other and are bent into said base.

7. The backlight module as claimed in claim 6, wherein each of said bent portions and said plate body define therebetween an angle ranging from 0 to 120 degrees, and the angles between said bent portions and said plate body can be same or different.

8. The backlight module as claimed in claim 6, wherein each of said light guide plates further includes a diffusion structure provided on said bent portion.

9. The backlight module as claimed in claim 6, wherein each of said light guide plates further has a function layer provided on an end face of said bent portion, said function layer having a light reflection or light absorbing function.

10. The back light module as claimed in claim 6, further comprising a function layer provided within said base and confronting end faces of said bent portions of said light guide plates, said function layer having a light reflection or light absorbing function.

* * * * *